United States Patent [19]

Karbachsch et al.

[11] Patent Number: 4,983,288
[45] Date of Patent: Jan. 8, 1991

[54] FILTER ELEMENT WITH MEMBRANE-TYPE FILTER MATERIAL

[75] Inventors: Massoud Karbachsch, Göttingen; Manfred Pett, Wiesbaden, both of Fed. Rep. of Germany

[73] Assignee: Seitz-Filter-Werke Theo & Geo Seitz GmbH und Co., Bad Kreuznach, Fed. Rep. of Germany

[21] Appl. No.: 361,035

[22] Filed: Jun. 2, 1989

[30] Foreign Application Priority Data

Jun. 3, 1988 [DE] Fed. Rep. of Germany ....... 3818860

[51] Int. Cl.$^5$ .............................................. B01D 69/12
[52] U.S. Cl. ................................ 210/321.87; 210/490
[58] Field of Search ............... 210/490, 505, 503, 507, 210/321.84, 321.87

[56] References Cited

U.S. PATENT DOCUMENTS

| | | | |
|---|---|---|---|
| 3,158,532 | 11/1964 | Pall et al. .......................... | 210/505 |
| 3,285,421 | 11/1966 | McKewey, Jr. et al. ... | 210/321.84 X |
| 3,353,682 | 11/1967 | Pall et al. .......................... | 210/505 |
| 4,073,732 | 2/1978 | Lauer et al. ....................... | 210/491 |

FOREIGN PATENT DOCUMENTS

| | | |
|---|---|---|
| 0083489 | 7/1983 | European Pat. Off. . |
| 0096339 | 12/1983 | European Pat. Off. . |
| 2622804 | 5/1976 | Fed. Rep. of Germany . |
| 3407252 | 9/1984 | Fed. Rep. of Germany . |
| 1501665 | 2/1978 | United Kingdom . |

OTHER PUBLICATIONS

Heiner Strathmann "Trennung von Molekularen Mischungen mit Hilfe Synthetischer Membranen", 1979.
Dytnerskij, "Membranprozesse zur Trennung Voflüssiger Germische", 1977.

*Primary Examiner*—Frank Spear
*Attorney, Agent, or Firm*—Herbert Dubno

[57] ABSTRACT

A filter element for a filter cartridge has an upstream or prefiltering membrane with frustoconical pores converging in the direction of liquid flow through the filter element and a final filtering membrane at the downstream side with cylindrical pores smaller than the smallest diameter of the frustoconical pores.

17 Claims, 4 Drawing Sheets

FILTER ELEMENT WITH MEMBRANE-TYPE FILTER MATERIAL

FIELD OF THE INVENTION

Our present invention relates to a filter element, especially a cartridge-type filter or candle filter, which is provided with filter membranes and the filter material in a support structure. Such filters in cartridge form can be inserted in a filter housing and can be traversed by a liquid in a given direction, e.g. radially inwardly, so that nonfilterable substances are collected upon the filter material which is provided on an elongated, generally tubular and cylindrical, support structure.

BACKGROUND OF THE INVENTION

Cartridge-type filter elements in which the filter material comprises a plurality of filter membranes, have been provided heretofore with at least one filter membrane constituted as a prefilter or an upstream filter, with respect to a direction of displacement, and at least one other filter membrane as a final filtering membrane at the downstream side of the filter material with respect to the direction of flow of the liquid medium therethrough.

Filter elements having combinations of membrane filters have been provided heretofore as cartridge filters or as filter disk elements and can be used for the filtration of macromolecular or colloidal solutions, for the removal of particles from water, for the filtration of solvents and for the sterile filtration of frustoconical and biotechnology generated preparations as well as comestibles.

It is known to provide such filter elements, which have two membrane filters as described, so that both filter membranes have pores of the same diameters (so-called homogeneous restriction). Membrane filters are also known in which the prefiltering membrane and the final filtering membrane have different pore sizes (so-called heterogeneous construction).

In all of these known membrane filters, the membrane filters of each element have the same or different pore sizes, either in symmetrical or asymmetrical geometry and the same chemical compositions. The materials used can be nylon 66, cellulose acetate (a cellulose derivative), a polysulfone, polyvinylidenefluoride (PVDF) or polytetrafluoroethylene (PTFE).

The filter elements of the prior art in the homogeneous construction have the disadvantage that the operating life is relatively short since solid particles or colloid materials rapidly plug the pores of the first filter membrane so that the final filtering membrane, which may be only partly loaded, becomes ineffective for filtering purposes since there is no substantial flow therethrough.

With conventional membrane filter elements of the heterogeneous construction, the larger particles are retained by the large pores of the prefiltering membrane while the smaller particles pass the first membrane and are retained on the final filtering membrane because of the smaller pores thereof. In this latter arrangement the useful life of the filter is greater than is the case with filter elements utilizing a homogeneous construction.

Thus filter elements with filter membranes having an asymmetric pore geometry and the same chemical composition in the homogeneous or heterogeneous construction, the useful life of the filter element will be greater than that of filter elements with membranes with symmetrical pores in homogeneous or heterogeneous construction, respectively, but the filtration reliability, namely, the assurance that small microorganisms will be retained on the filter during sterile filtration, is not assured.

OBJECTS OF THE INVENTION

It is, therefore, the principal object of the present invention to provide a filter element which will have a greater useful life with at least the same filtration reliability than earlier membrane filters.

Another object of this invention is to provide a filter element, preferably a cartridge filter, which overcomes the drawbacks of prior art systems.

Still another object of our invention is to provide a more reliable filter, capable of use for sterilization, but which can have a greater operating life than has been expected heretofore with membrane filters of the prior art.

SUMMARY OF THE INVENTION

These objects and others which will become apparent hereinafter are attained in accordance with the invention with a filter element in which a support structure is provided, preferably in cartridge filter form, on which the filter material is disposed and the filter material comprises at least one prefiltering membrane at an upstream side of the liquid path through the filter and at least one final filtering membrane at the downstream side of this path. According to the invention, the prefiltering membrane is provided with frustoconical pores decreasing in diameter in the flow direction and hence an asymmetric pore structure while the final filtering membrane is formed with cylindrical pore (symmetrical pore structure). The prefiltering membrane and the final filtering membrane are constituted of different materials from the point of view of chemical composition.

The cartridge filter of the invention thus can comprise:

a support structure;

means on the support structure for guiding a flow of a fluid through the support structure from an upstream side to a downstream side;

a prefiltering membrane on the upstream side of the support structure, traversed by the fluid and formed with frustoconical pores forming an asymmetric pore structure converging in a flow direction from the upstream side to the downstream side; and a final filtering membrane on the downstream side of the support structure, of a chemical composition different from that of the prefiltering membrane, traversed by the fluid in the direction and formed with generally cylindrical pores forming a symmetric pore structure.

The heart of the invention is found in the combination of at least two membranes of different chemical combinations and different pore sizes and pore geometry. While the individual membranes can be used in the combination of prefiltering and final filtering membranes if they are constituted of the same materials, we have surprisingly found that different materials give rise to surprisingly effective results utilizing a hybrid technique.

Because of the asymmetric configuration of the pores of the prefiltering membrane, substantially more large solid particles can be retained since these solid particles can be trapped even within the thickness of the membrane, than is the case with filters having symmetrical pores where retention of particles occurs substantially exclusively at the surface. This markedly increases the useful life of the filter. The smaller particles traverse the first membrane and are separated from the fluid on the final filtering membrane. Because of the symmetrical structure of the latter, this membrane provides enhanced filtration reliability, preventing breakthrough of microorganisms, and therefore ensures sterile filtration.

In the manufacture of membrane filter elements from synthetic polymers it is difficult and often impossible from a process point of view to fabricate from the same polymer membrane filter elements with small pore size in a symmetrical pore structure and membrane filter elements of larger pore sizes and an asymmetrical pore structure. Thus it is essential to fabricate the prefiltering and final filtering membranes from different polymers to ensure attention of the coarse or fine pore structures which are desired.

For example, it is possible to form membrane filters from nylon 66 in a simple and economical manner with small well defined pores having, for example, diameters of 0.1 micrometer, 0.2 micrometer, 0.45 micrometer, and 0.65 micrometer. It is, however, difficult from this material to produce a coarse defined pore structure with pores of a diameter of 0.8 to 3 micrometers.

However, aromatic polyamides can be used to readily fabricate a prefiltering membrane with this latter coarse pore structure although with this material the fabrication of small definition pore structures is difficult.

With the combination according to the invention of different filter materials and different pore size with different pore geometries, the filter materials of the invention, by comparison with known filter membranes, have a very high useful life with the same filtration reliability, for example, as to sterile filtration of pharmaceutical particles and comestibles.

Preferably, the small diameter $x_2$ of the pores of the prefiltering membrane are larger than the diameter $y$ of the pores of the final filtering membrane. In a preferred embodiment, the smallest diameter $x_2$ of the prefiltering membrane is in the range of 0.8 micrometers to 3 micrometers. The pores of the prefiltering membrane are so constituted that their diameters increase from the diameter $x_2$ in a direction opposite the flow direction by a factor of two to four times. This means that the largest diameter of the frustoconical pores is in the range of 1.6 to 12 micrometers.

The pores of the final filtering membrane preferably have a diameter $y$ of 0.1 to 0.65 micrometers and preferably the pores of both membranes are throughgoing pores having axes perpendicular to the membrane surfaces.

The prefiltering membrane can be constituted from aromatic polyamides, polysulfones or cellulose derivatives, e.g. cellulose acetate. The final filtering membrane can be constituted of aliphatic polyamides, polysulfones, polytetrafluoroethylene or polypropylene. The preferred aliphatic polyamide is nylon 66 while the preferred aromatic polyamide is a copolymer of m-phenyldiamine and isophthalic acid. The filter membrane can be fabricated by conventional techniques, e.g. solvent evaporation as a flat web or by settling or coagulation procedures. The prefiltering and final filtering membranes or filters can be sealingly bonded together by cementing or welding. They can also lie against one another to form the filter combination.

The surfaces of the prefiltering membrane and the final filtering membrane can also be modified.

According to another embodiment, the filter membrane of the prefilter is arranged on a deep-filter layer which can be composed, for example, of glass fibers. A glass fiber reinforced prefilter of the aforemention type will more double the life of a filter in comparison to a filter without the deep-filter reinforcement.

In still another embodiment of the invention, the membrane of the prefilter is embedded in a deep filter layer, e.g. of glass fibers. This means that the material of the membrane layer at least partly penetrates into the deep-filter layer. It is important here that the deep-filter layer be turned to the filtering liquid so that no fibers or particles released from the glass fibers emerge as the filtration occurs. An increase in reliability during sterile filtration is achieved by forming the final filter of at least two layers of filter membranes which can be fixedly bonded together. The individual layers can have the same chemical compositions and pore sizes or can be composed of different materials.

Preferably these layers can include a fleece (nonwoven knit) or a fabric (woven or knitted textile) of polyester or polypropylene or reinforced thereby and advantageously such a reinforcement can be provided for each or both of these layers.

For example, the final filtering membrane can be fabricated by applying one membrane or membrane material to the fabric or fleece and then applying to the opposite side of the fabric or fleece the second membrane.

Preferably the first membrane applied is a polysulfone while the second layer is an aliphatic polyamide and the pores in both layers have the same diameter.

Because of the different surface characteristics of the different materials of the prefiltering membrane and the final filtering membrane, these membranes have different surface properties, for example, different adsorption capacities or different affinities to different groups of materials.

It is also possible to modify these surface active characteristics for a particular application of the filter. This can be achieved by varying the side or terminal groups of the polymers since they generally comprise carboxyl or amino groups or such carboxyl or amino groups can be applied. It is thus especially advantageous that the prefilter and final filter are composed of different materials since that allows different surface properties to be provided for the prefilter and final filter. The combination of two membranes with different adsorption characteristics, of course, increases the operational life and efficiency of the filter by the adsorption effect. As a consequence, a hybrid filtering technology applies by comparison with conventional membrane filters.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
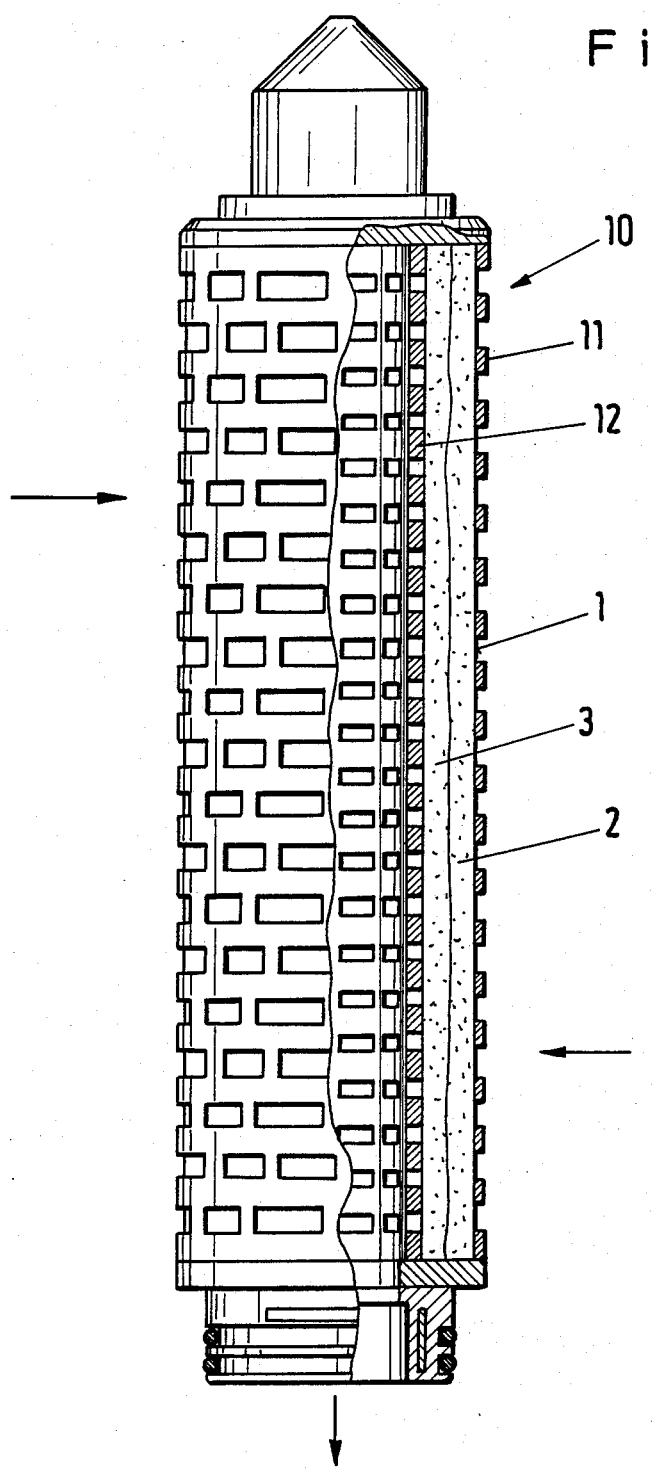
FIG. 1 is an elevational view, partly broken away, of a filter cartridge provided with the filter material of the present invention.

FIG. 1 shows a filter 10 having the filter material constituted as a prefiltering membrane or filter 2 and a final filtering membrane or filter 3 disposed between an outer perforated support shell 11 and an inner perforated tube 12 of a cartridge-type filter adapted to be fitted into a filter housing and connected at its ends with the latter. The arrows in FIG. 1 illustrate the flowing direction of the liquid to be filtered and this flow direction proceeds radially from the exterior to the interior through the filter material 2, 3. As a consequence, the prefilter 2 is located at the upstream side of the filter and the final filter 3 at the downstream end thereof.

Figure 2:
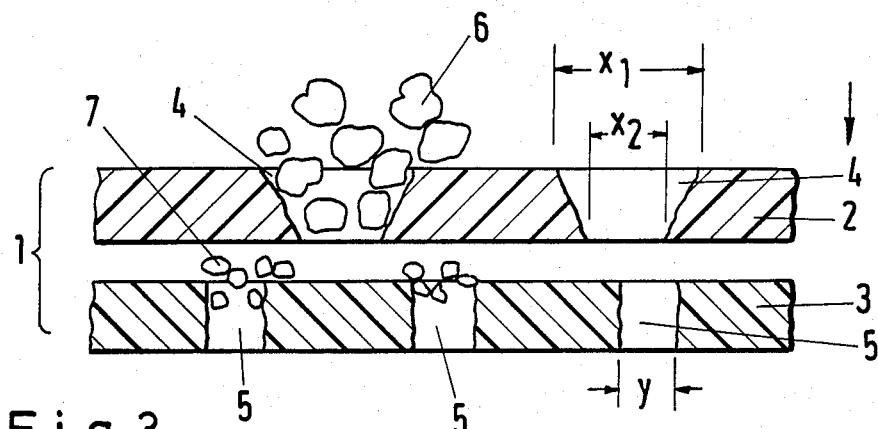
FIG. 2 is a diagrammatic cross sectional view illustrating the principle of operation of the filter material of the invention.

FIG. 2 schematically shows a cross section through the filter element or material 1. In the prefiltering membrane 2 there are frustoconical pores 4 whose smallest diameters are represented at $x2$ and whose largest diameters are shown at $x1$. In this embodiment, the prefiltering membrane 2 rests exactly against the final filtering membrane 3 which has cylindrical pores 5 of the diameter $y$. The diameter $y$ is smaller than the smallest diameters $x2$ of the frustoconical pores 4.

At the left hand side of FIG. 2, the collection of large particles 6 in a frustoconical pore 4 has been diagrammatically illustrated. The smaller particle 7 are held back by the cylindrical pores 5 of the final filtering membrane. To illustrate this, a gap has been provided in the drawing between the two filter membranes. The arrow in the upper right shows the flow direction of the liquid to be filtered.

Figure 3:
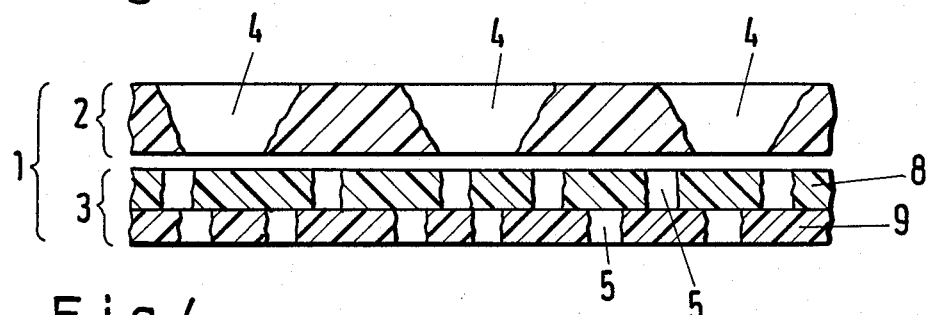
FIGS. 3 through 5 are cross sectional views, also in highly diagrammatic form and drawn to a severely enlarged scale illustrating other embodiments of the filter element.

FIG. 3 shows a prefiltering filter which corresponds to the membrane 2 of FIG. 1 and here the final filtering element is constituted from two layers 8 and 9 which are bonded firmly together. Note that these layers have different pore distributions but corresponding pore diameters.

Figure 4:
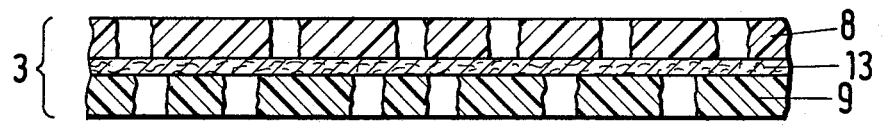

FIG. 4 shows a further embodiment of the final filtering 3 membrane or larger. In this case, the layers 8 and 9 are applied to a reinforcing fabric layer 13 as has been generally described above.

Figure 5:
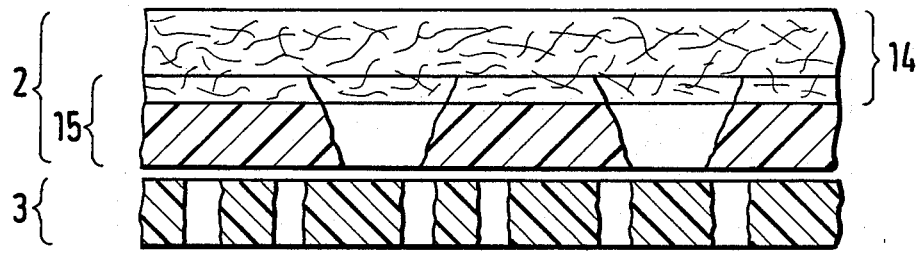
Figure 6:
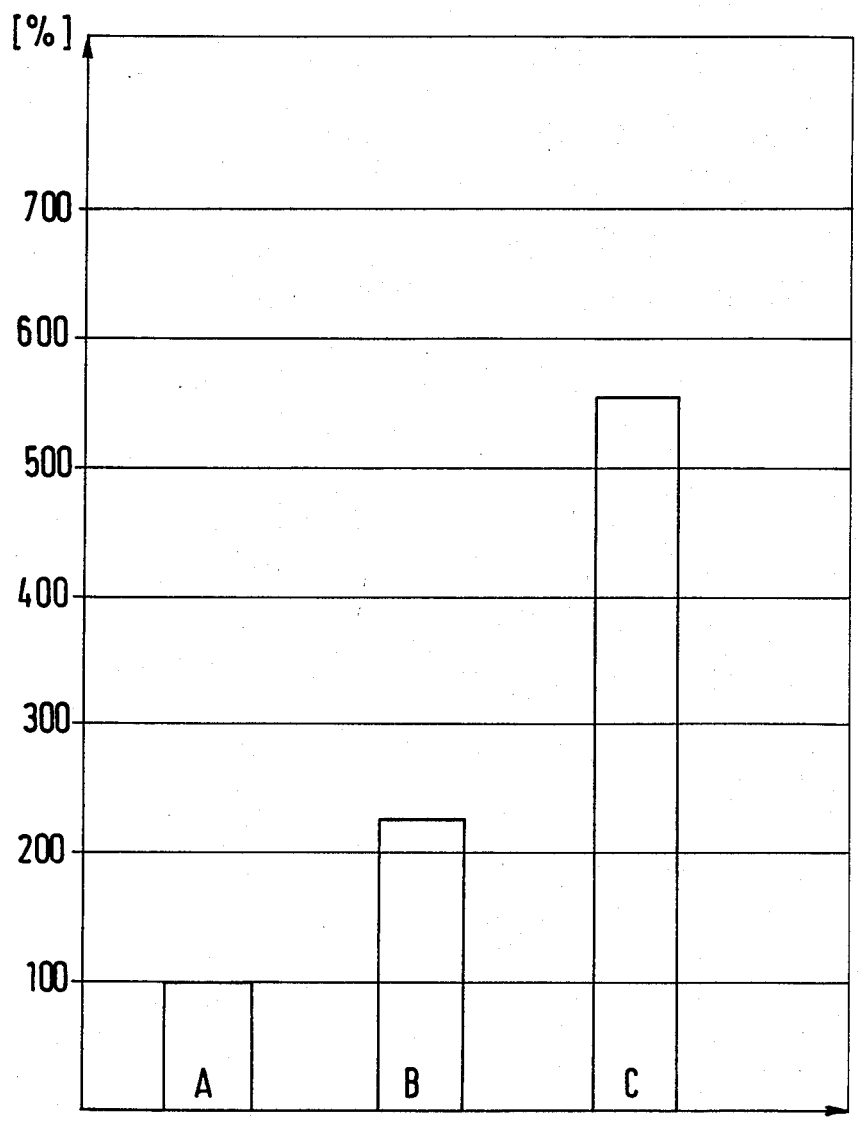
FIGS. 6 and 7 are two diagrams in which the filter effectiveness is plotted for three filter membranes each.

The embodiment of FIG. 5 provides the prefilter 15 on a deep filter layer 14 so that the membrane 15 partly penetrates into the deep filter and is embedded therein. The advantage of this embodiment with respect to conventional membrane filters will be apparent by a comparison of the diagrams illustrated in FIGS. 6 and 7. FIG. 6 illustrates the filtration volume for three different membrane filter combinations before the filter becomes plugged or inoperative. The graph A represents a conventional filter element in which the prefilter and final filter are composed of the same material, namely, nylon 66. The pores of these membranes are cylindrical and have a pore size (diameter) of 0.2 micrometers.

B represents a filter element of the invention wherein the final filter is composed of nylon 66 with pores of a pore size of 0.2 micrometer. The filter consists of polysulfone with frustoconical pores whose smallest diameter $x2$ is 0.8 micrometers and whose largest diameter $x1$ is about 2 micrometer.

C shows a filter element of the invention in which the final filter also is composed of nylon 66 with a pore size of 0.2 macrometer. The prefilter is composed of an aromatic polyamide membrane which is applied to a glass fiber deep filtering layer. FIG. 6 shows the results obtained with the filtration of a 1% aqueous raw sugar solution.

The filter element B of the invention has an operating life which is increased to 225% above that of the conventional filter while the glass fiber reinforced aromatic polyamide filter element C has its operating duration increased to 550% of that of the conventional filter element. With the same filter effectiveness or reliability the operating life can thus be increased from two to five times that of filter element A.

Figure 7:
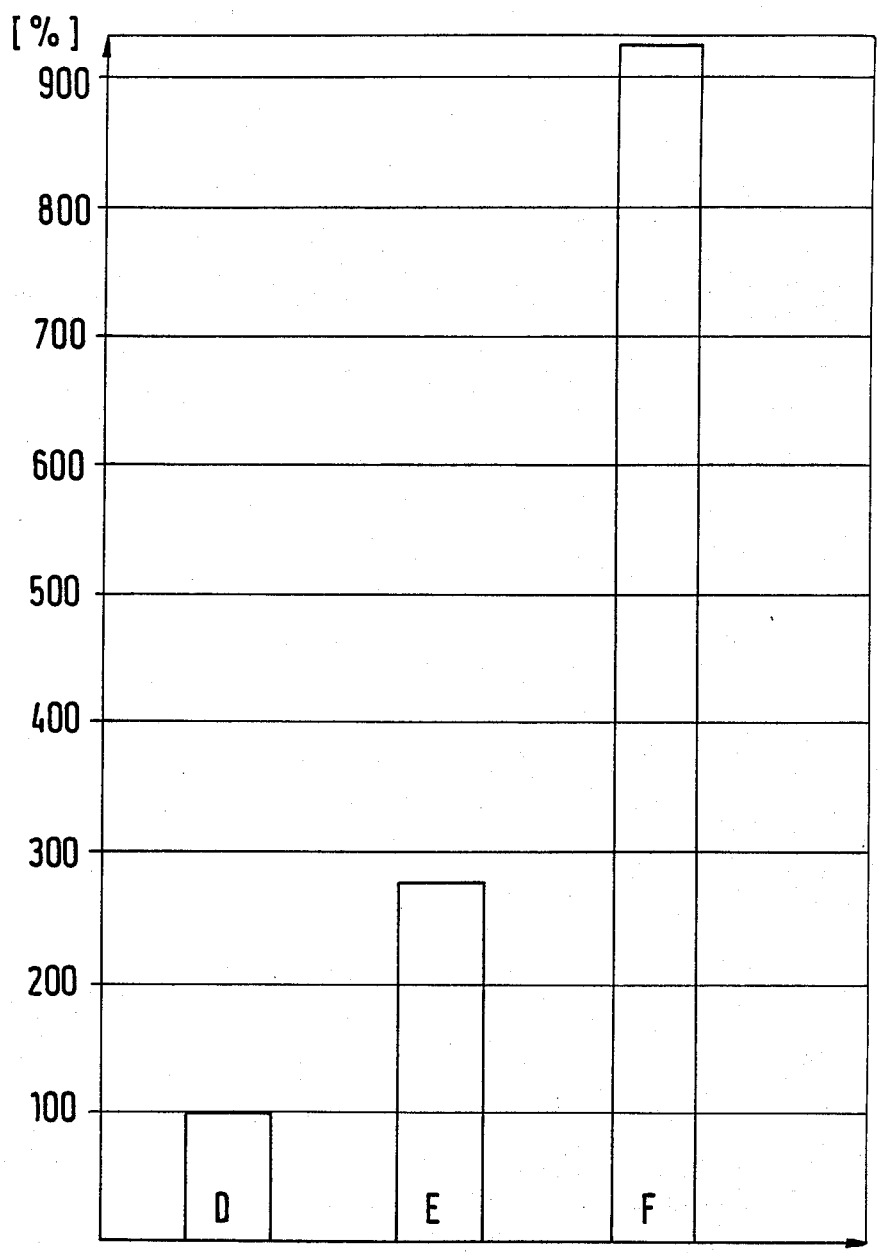

FIG. 7 shows at D the results with a conventional filter element whose prefilter and final filter each are composed of nylon 66 with cylindrical pores of a pore size of 0.45 micrometer. E and F represents the results of filter elements like those of graphs B and C of FIG. 6 except that the final filter in each case, consisting of nylon 66 has a pore size of 0.45 micrometer. The smallest diameter of the frustoconical pores of the prefilter is 1.2 micrometer and the largest diameter is 3 to 4 micrometer.

When polysulfone forms the prefilter (curve E) the operating life is increased by 270% and the combination of the polyamide membrane with the glass fiber reinforcement of graph F increases the filter effectiveness by 970% the prefilter 2 used in FIGS. 6 and 7 can be constructed as illustrated in FIG. 5 and in this case the glass fibers are embedded in the aromatic polyamide. This embedding has the advantage that fiber or particle release from the glass fibers to the filtrate side during filtration will be prevented or retarded. This additional advantage permits the use of such filter elements in especially critical filtrations for example in the pharmaceutical and chemical industries where particle free filtrates are required.

We claim:
1. A filter element, comprising:
   a support structure;
   means on said support structure for guiding a flow of a fluid through said support structure from an upstream side to a downstream side;
   a prefiltering membrane on said upstream side of said support structure, traversed by said fluid and forming an asymmetric pore structure with pores converging in a flow direction from said upstream side to said downstream side; and
   a final filtering membrane on said downstream side of said support structure, of a chemical composition different from that of said prefiltering membrane, traversed by said fluid in said direction and formed with pores of generally uniform cross section forming a symmetric pore structure.

2. The filter element defined in claim 1 wherein said support structure and said membranes form a cartridge filter.

3. The filter element defined in claim 2 wherein said pores of said prefiltering membrane have smallest diameters $x2$ which are larger than diameters $y$ of the pores of said final filtering membrane.

4. The filter element defined in claim 3 wherein said smallest diameters $x2$ are in a range of 0.8 micrometer to 3 micrometers and the diameters of the pores of said prefiltering membrane increase from said smallest diameters in a direction opposite to said flow direction by a factor of two to four times.

5. The filter element defined in claim 2 wherein said diameters $y$ range from 0.1 micrometer to 0.65 micrometer.

6. The filter element defined in claim 2 wherein said prefiltering membrane is composed of an aromatic polyamide or polysulfone or a cellulose derivative and said final filtering membrane is composed of an aliphatic polyamide or polysulfone or polyvinylidenefluoride, polytetrafluoroethylene or polypropylene.

7. The filter element defined in claim 6 wherein said final filtering membrane is composed of an aliphatic polyamide and said aliphatic polyamide is nylon 66.

8. The filter element defined in claim wherein said prefiltering membrane is composed of an aromatic polyamide and said aromatic polyamide is a copolymer of isophthalic acid and m-phenyldiamine.

9. The filter element defined in claim 2 wherein said prefiltering membrane is formed on a deep-filter layer.

10. The filter element defined in claim 9 wherein said deep-filter layer is formed from glass fibers.

11. The filter element defined in claim 9 wherein said deep-filter layer is embedded in a polyamide, polysulfone or a cellulose derivative.

12. The filter element defined in claim 2 wherein said final filtering membrane is constituted of at least two membrane layers.

13. The filter element defined in claim 12 wherein said layers are bonded fixedly together.

14. The filter element defined in claim 12 wherein said layers have different chemical compositions.

15. The filter element defined in claim 12 wherein said layers are reinforced by a fibrous fleece or textile fabric interposed between said layers.

16. The filter element defined in claim 12 wherein said fibrous fleece or textile fabric interposed between said layers is composed of polypropylene or polyester.

17. The filter element defined in claim 2 wherein the chemical compositions of the prefiltering and final filtering membranes are selected so that the membranes have different surface characteristics.

* * * * *